(12) United States Patent
Morris et al.

(10) Patent No.: US 8,589,080 B2
(45) Date of Patent: Nov. 19, 2013

(54) GEOLOGICAL STRESS INVERSION USING FAULT DISPLACEMENT AND SLIP TENDENCY

(75) Inventors: Alan P. Morris, Helotes, TX (US);
David A. Ferrill, San Antonio, TX (US);
John M. McFarland, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 347 days.

(21) Appl. No.: 13/047,704

(22) Filed: Mar. 14, 2011

(65) Prior Publication Data

US 2012/0239298 A1    Sep. 20, 2012

(51) Int. Cl.
| | |
|---|---|
| G01V 1/28 | (2006.01) |
| G01V 1/30 | (2006.01) |
| G01V 1/32 | (2006.01) |

(52) U.S. Cl.
USPC ........... 702/15; 702/2; 702/6; 702/11; 702/14

(58) Field of Classification Search
USPC ............................................. 702/2, 6, 11, 14
See application file for complete search history.

(56) References Cited

U.S. PATENT DOCUMENTS

| | | | | |
|---|---|---|---|---|
| 4,781,062 | A * | 11/1988 | Taylor | 73/152.16 |
| 6,904,365 | B2 * | 6/2005 | Bratton et al. | 702/9 |
| 2002/0091502 | A1 * | 7/2002 | Malthe-Sorenssen et al. | 703/2 |

OTHER PUBLICATIONS

Atsushi Yamaji, The multiple inverse method: a new technique to separate stresses from heterogeneous fault-slip data, Journal of Structural Geology 22 (2000) 441-452.*

Evelyne Carey-Gailhardis & Jacques Louis Mercier, A numerical method for determining the state of stress using focal mechanisms of earthquake populations: application to Tibetan teleseisms and microseismicity of Southern Peru, Earth and Planetary Science Letters, 82 (1987) 165-179.*

R. Armijo, E Carey, & A. Cisternas, The Inverse problem in microtectonics and the separation of tectonic phases, Tectonophysics, 82 (1982) 145-160.*

Katsushi Sato, Incorporation of incomplete fault-slip data into stress tensor inversion, Tectonophysics 421 (2006) 319-330.*

Inga Moeck, Grzegorz Kwiatek b, Günter Zimmermanna, Slip tendency analysis, fault reactivation potential and induced seismicity in a deep geothermal reservoir, Journal of Structural Geology 31 (2009) 1174-1182.*

John W. Gephart, Donald W. Forsyth, An Improved Method for Determining the Regional Stress Tensor Using Earthquake Focal Mechanism Data: Application to the San Fernando Earthquake Sequence, Journal of Geophydical Research, vol. 89, No. B11, pp. 9305-9320, Oct. 1984.*

Tobore Orife, Luis Arlegui, & Richard J. Lisle, DIPSLIP: a QuickBasic stress inversion program for analyzing sets of faults without slip lineations, Computers & Geosciences 28 (2002) 775-781.*

Alan, Morris, David A. Ferrill, & D. Brent Henderson, Slip-tendency analysis and fault reactivation, Geology, vol. 24, No. 3, pp. 275-278, Mar. 1996.*

* cited by examiner

*Primary Examiner* — Andrew Schechter
*Assistant Examiner* — John Kuan
(74) *Attorney, Agent, or Firm* — Chowdhury & Georgakis P.C.; Ann C. Livingston

(57) ABSTRACT

A computer-implemented method of determining the stress state associated with a geological fault is described. The source data comprises measured fault displacement values, or proxy displacement values, associated with the fault. An error function calculates error as a function of normalized fault displacement and normalized slip tendency. Candidate stress states are used to determine slip tendency values, which are used in the error function to calculate an error value. This value is minimized to determine the "best" candidate stress state.

14 Claims, 8 Drawing Sheets

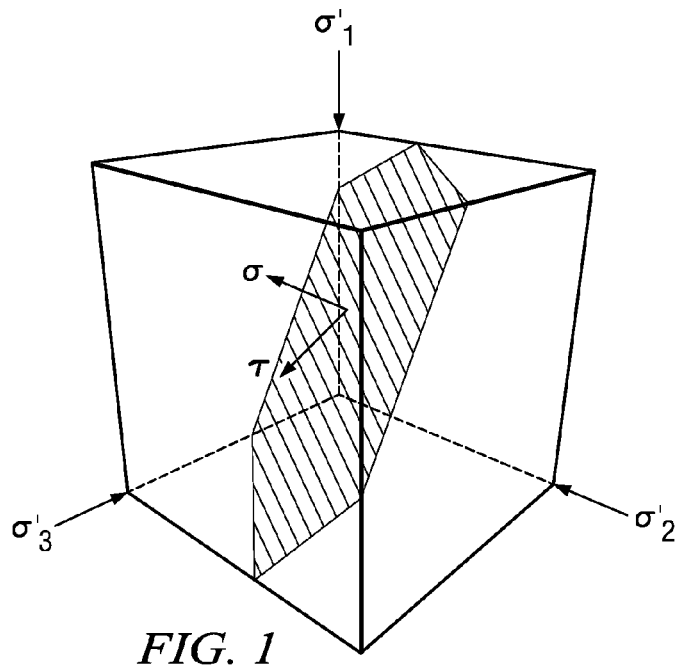
FIG. 1
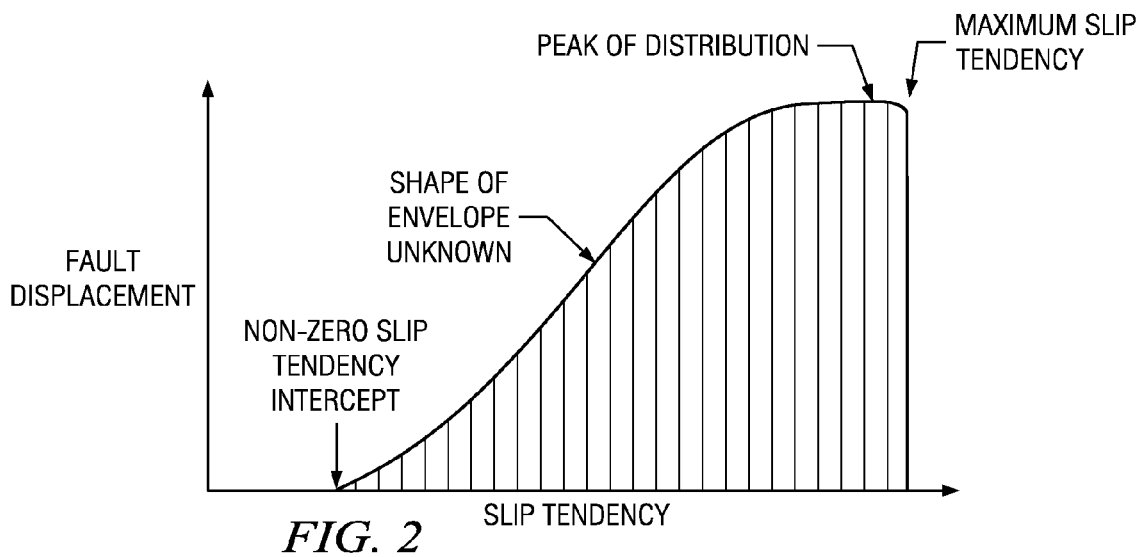
FIG. 2
ERROR MEASURE:
$$\varepsilon = \begin{cases} 2 \times (\bar{D} - \bar{T}s) & \text{IF } \bar{D} > \bar{T}s \quad \text{(a)} \\ 2 \times (\bar{T}s)^2 & \text{IF } \bar{D} = 0 \quad \text{(b)} \\ -0.5 \times (\bar{D} - \bar{T}s)^2 & \text{OTHERWISE} \quad \text{(c)} \end{cases}$$
FIG. 3
WHERE $\bar{D}$ = NORMALIZED DISPLACEMENT
AND $\bar{T}s$ = NORMALIZED SLIP TENDENCY

GEOLOGICAL STRESS INVERSION USING FAULT DISPLACEMENT AND SLIP TENDENCY

TECHNICAL FIELD OF THE INVENTION

This invention relates to analysis of geological faults, and more particularly to estimation of the stress state responsible for an observed fault or faults.

BACKGROUND OF THE INVENTION

The earth's crust is subject to stresses that are the combined result of gravitational loading and heat-transfer-driven tectonic processes. One class of responses to these stresses can be described as brittle behavior responses. These responses include the formation and propagation of fractures, both extensional and shear. In geological terminology, shear fractures that accommodate measurable amounts of displacement are called faults.

Geologic slip tendency analysis is a technique that permits assessment of stress states and related potential fault activity. The tendency of a surface to undergo slip in a given stress field depends on its frictional characteristics (primarily controlled by rock type) and its "slip tendency". The latter measure is defined as the ratio of shear stress to normal stress acting on a fault surface. Slip tendency analysis has been used successfully to characterize fault slip and fault slip direction in stress regimes associated with normal, reverse, and strike-slip faulting.

Related to slip tendency analysis, are "stress inversion" calculations, i.e., the determination (inversion) of the stress tensor from the effects of that stress tensor. Data sources for existing stress inversion methods have included earthquake focal mechanisms, paleostress indicators, and micro-seismicity. These methods rely on knowledge of the slip vector field generated by the stress state being sought.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates the meaning of the term "slip tendency".

FIG. 2 illustrates the relationship between slip tendency and fault displacement, and "fault displacement" envelope that is a function of slip tendency.

FIG. 3 illustrates the calculation of an error measure, used for estimation of a stress tensor.

DETAILED DESCRIPTION OF THE INVENTION

Figure 4A:
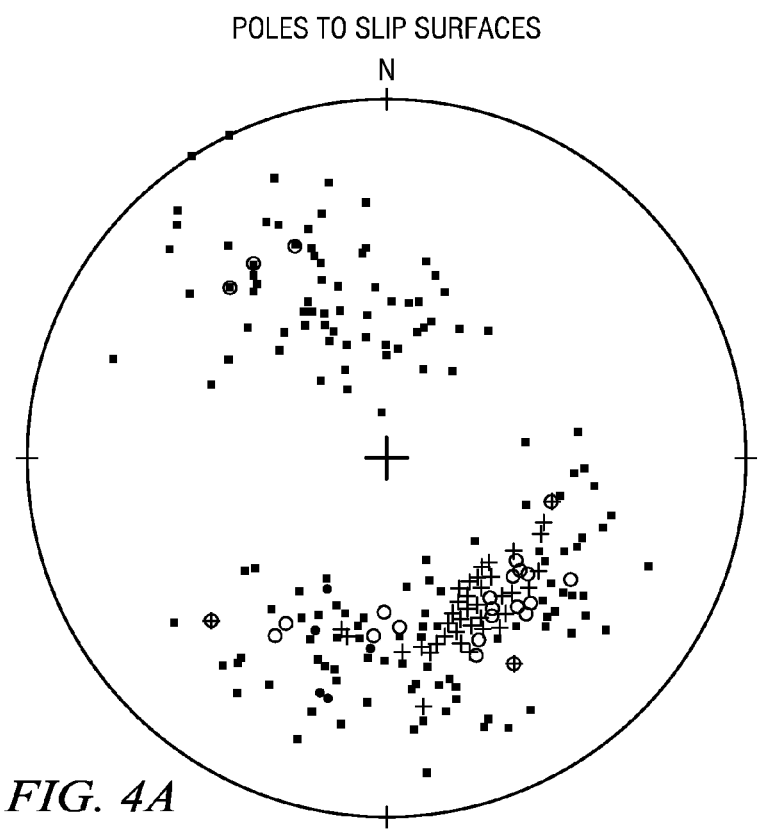
FIGS. 4A, 4B, and 4C illustrate an example of field data acquired for small-displacement normal faults.

The following description is directed to a method of estimating the stress state responsible for an observed fault. As stated in the Background, the method is distinguishable from conventional stress inversion methods, which determine stress states from slip vector data. A problem with conventional methods is that slip vector data has limited availability. For example, slip vector data is not generally available from seismic reflection data and microseismic swarms commonly used in the oil and gas industry.

The method described herein can use fault displacement data as its source data. Such data can easily be extracted from datasets routinely used by the oil and gas industry. In general, fault displacement data are generally more readily available than slip vector data. The methods described herein have extended application in seismic hazard assessments.

More specifically, the stress inversion method uses patterns of slip tendency. The method requires the input of slip surface orientations and displacements, but permits the use of a variety of proxies for displacement, such as fault area and earthquake focal mechanisms and magnitudes (including microseismic data). The method incorporates rock strength data, and constrains calibration of the inverted stress tensor to geologically realistic values.

FIG. 1 illustrates the meaning of the term "slip tendency". As used herein, "slip tendency" is a measure of the relative likelihood that a fault or fracture will slip. It is the ratio of the resolved shear stress to the resolved normal stress on a surface. It is notated as Ts, and expressed mathematically as:

$$Ts = \tau/\sigma,$$

where $\tau$=resolved shear stress and $\sigma$=resolved normal stress.

The shear and effective normal stress acting on a given plane depend on the orientation of the planes within the stress field that is defined by principal stresses. The variables $\sigma_1$, $\sigma_2$, and $\sigma_3$ are the "principal stresses" and define the "stress state". Different $\sigma$ values will result in different values for Ts.

The method described herein is based on several premises. A first premise is that slip tendency distributions are sensitive to the stress tensor, that is, the orientations and relative magnitudes of the principal stresses. A corollary of this premise is that slip tendency distributions should be usable as a basis for "inverting" a portion of the stress tensor that governed their formation. This is analogous to, but different from, using slip direction distributions to invert stress tensor components.

A second premise is that cumulative (finite) fault displacement is closely related to slip tendency. Over time, and under stable stress conditions, it can be expected that fault orientations experiencing high slip tendency will have slipped more frequently and thus will have accumulated more displacement than those with lower slip tendencies. Also, it can be expected that some orientations would not be represented at all because stresses would never reach threshold values for faults to form in these orientations.

Conceptually, there should be a positive correlation between slip tendency and cumulative fault slip, but with a nonzero slip tendency intercept. Also, an individual slip surface that has a high slip tendency orientation will not necessarily have accumulated a large amount of slip—it may have been in the stress shadow of a larger slip surface or it may only have become active late in the deformation history. Thus, surfaces with high slip tendencies may be represented by multiple displacement values from high to low, but surfaces with lower slip tendencies will exhibit lower values of displacement.

The third premise is that crustal rocks have limited strength. The slip tendency required to form and slip a fault is equivalent to the slope of a rock's Mohr-Coulomb failure envelope. Stress states that give rise to slip tendencies greater than the strength of the rock cannot exist in the Earth other than momentarily.

FIG. 2 illustrates the relationship between slip tendency and fault displacement, and a corollary of the above-stated second and third premises. Specifically, FIG. 2 illustrates an example, for rock having given properties, of the relationship between slip tendency and cumulative fault displacement. A fault displacement "envelope" may be defined and filled with data points. At the low end, the slip tendency has a non-zero slip tendency intercept. The peak of distribution can be narrow or broad, depending on rock properties. At the maximum slip tendency that can be supported by the rock, there is a sharp cutoff.

It follows from FIG. 2 that slip tendency (Ts) and fault displacement (D) are positively correlated. A realistic range of slip tendency for faulting is 0.2-0.8. An orientation for which no slip is recorded is useful information. The shape of the "envelope" may vary for different rock.

FIG. 3 illustrates the calculation of an error measure, $\epsilon$, used in a minimization function that estimates a stress tensor. The error measure is calculated from normalized displacement, D, and normalized slip tendency, $T_s$. "Normalized" means that the values range from 0 to 1. Normalization of values representing D and $T_s$ allow them to be mathematically compared.

As illustrated, the error measurement function is calculated "conditionally", that is, there are three conditions for calculating $\epsilon$: (a), (b) and (c). The error measure is large if the displacement is large for a small value of slip tendency (a), but small if the displacement is small for a large value of slip tendency (c). These two conditions recognize that high slip tendency orientations may have only small finite displacements because they slipped late in the deformation history. Artificial zero displacement points for orientations for which no slip is recorded are added to the data (b) to encourage zero slip tendencies for these orientations in the solution.

The quality of a candidate stress state is measured in terms of the sum of squared errors for the n data points in the data set:

$$\Sigma\epsilon^2,$$

for i=1 . . . n.

The stress inversion algorithm is one of finding the particular stress state or states that minimize this value. The values for D are obtained from the field data, that is, values of measured displacement. As explained above in connection with FIG. 1, for every "trial" value of the principal stresses, there will be a different value of $T_s$ for each surface in the data set.

The algorithm (computer implemented) tests a given stress state (the three principal $\sigma$ values) through the data set to find an error value for that stress state. The algorithm then repeats these error calculations for a multitude of stress states, and then finds the stress state that minimize $\epsilon$. Various nonlinear regression methods may be used to implement the error minimization calculations.

Figure 4C:
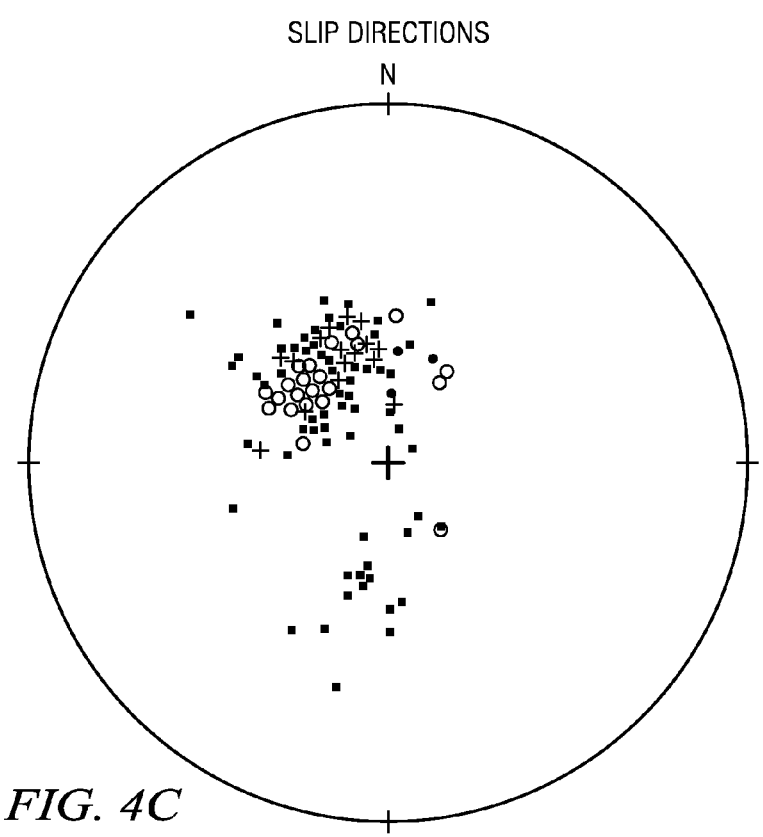
Figure 4B:
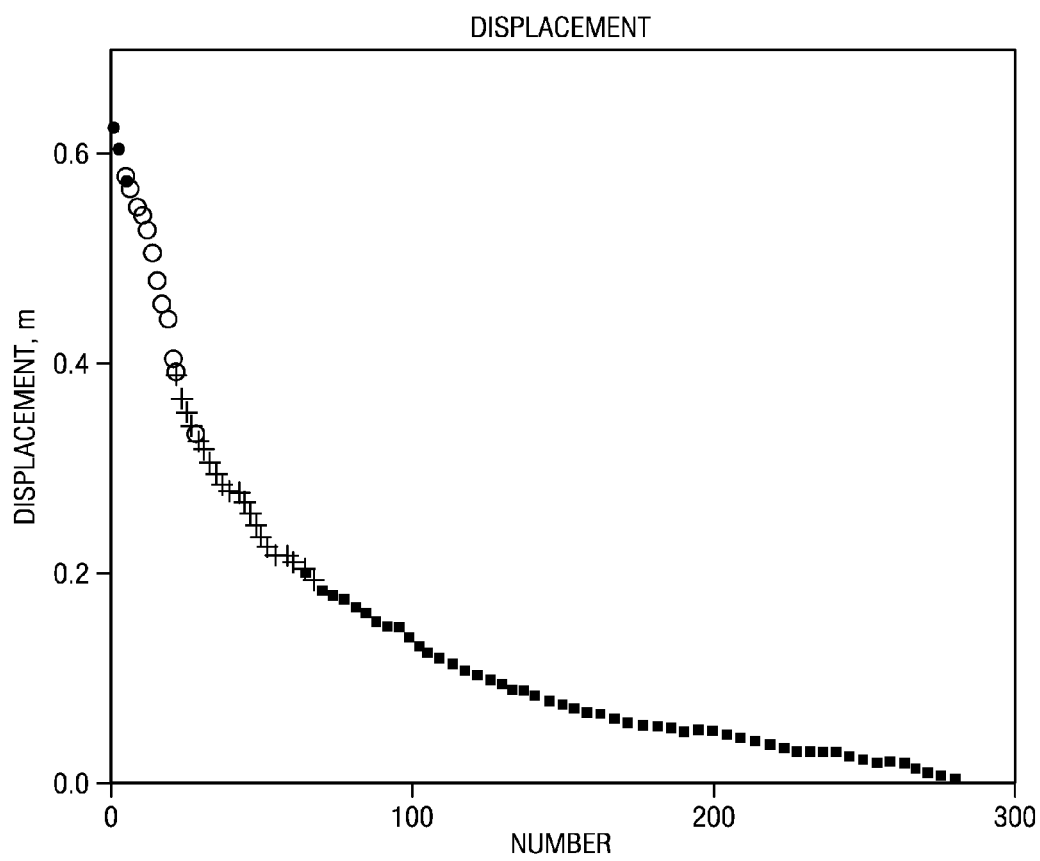

FIGS. 4A, 4B, and 4C illustrate field data acquired for small-displacement normal faults exposed on a bedding pavement in the hanging wall of a 60 meter throw fault. FIG. 4A is a plot of poles to slip surfaces. FIG. 4B is a plot of displacement. FIG. 4C is a plot of slip directions. In actual practice, the data points on these plots may be graphically colored, with the color of each plot point indicating a range of magnitude. Techniques for acquiring fault displacement data are well known in the art of geology.

Figure 5A:
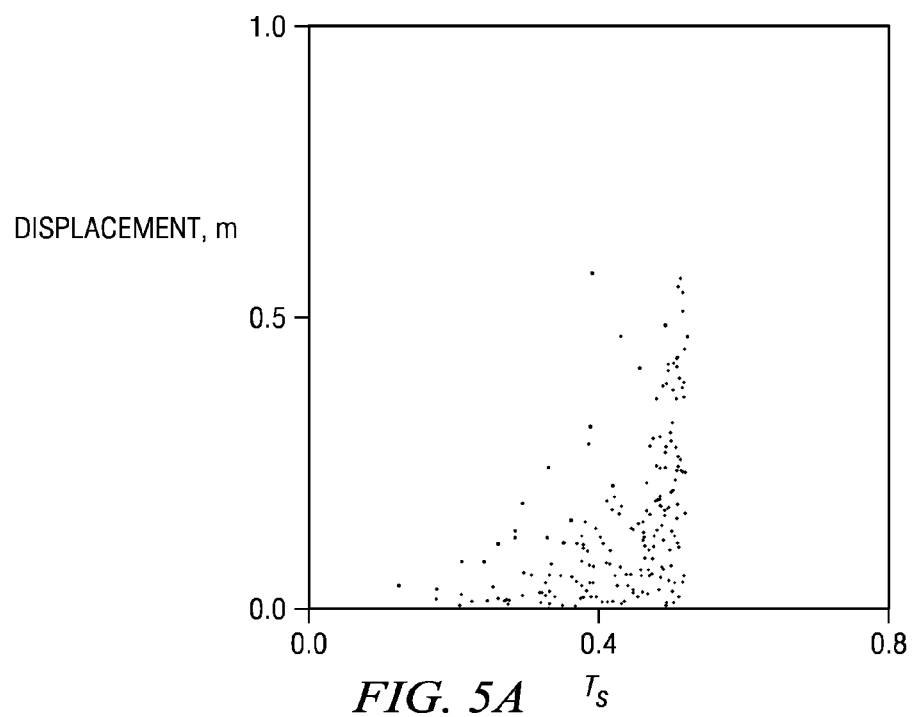
FIGS. 5A, 5B and 5C illustrate the results of the stress inversion method applied to the data of FIGS. 4A, 4B and 4C.
Figure 5B:
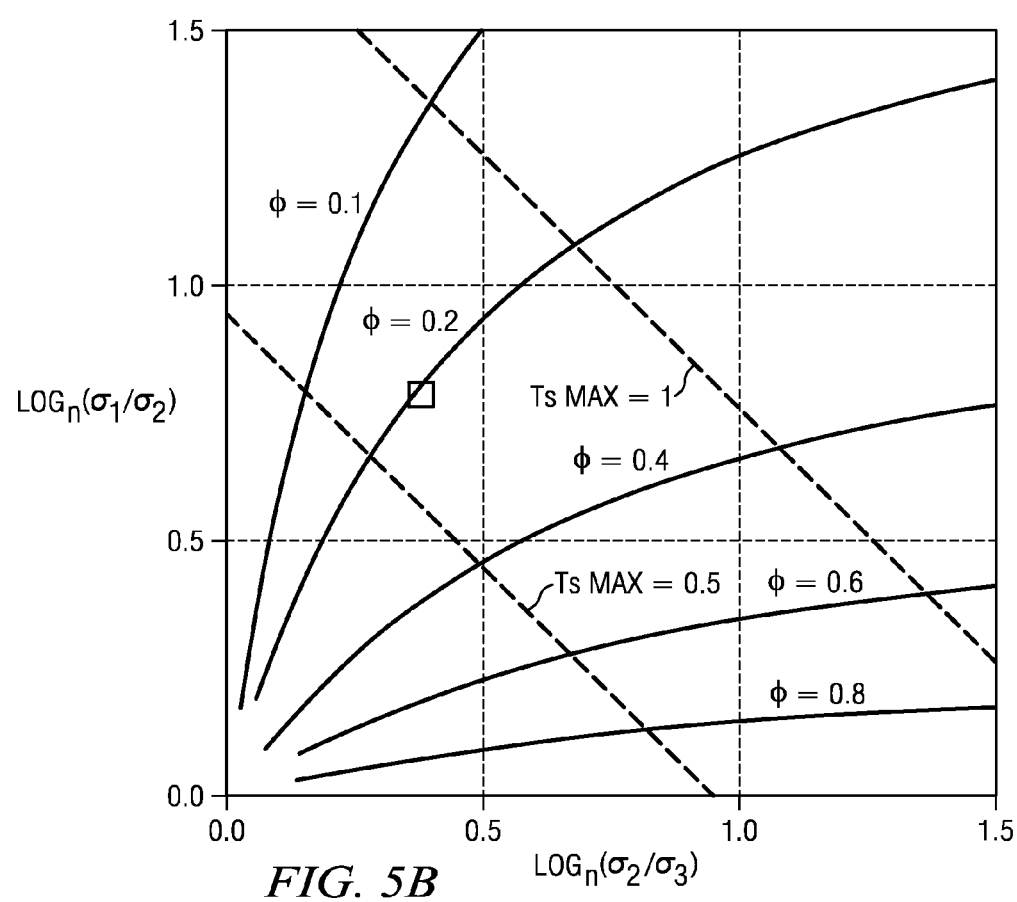
Figure 5C:
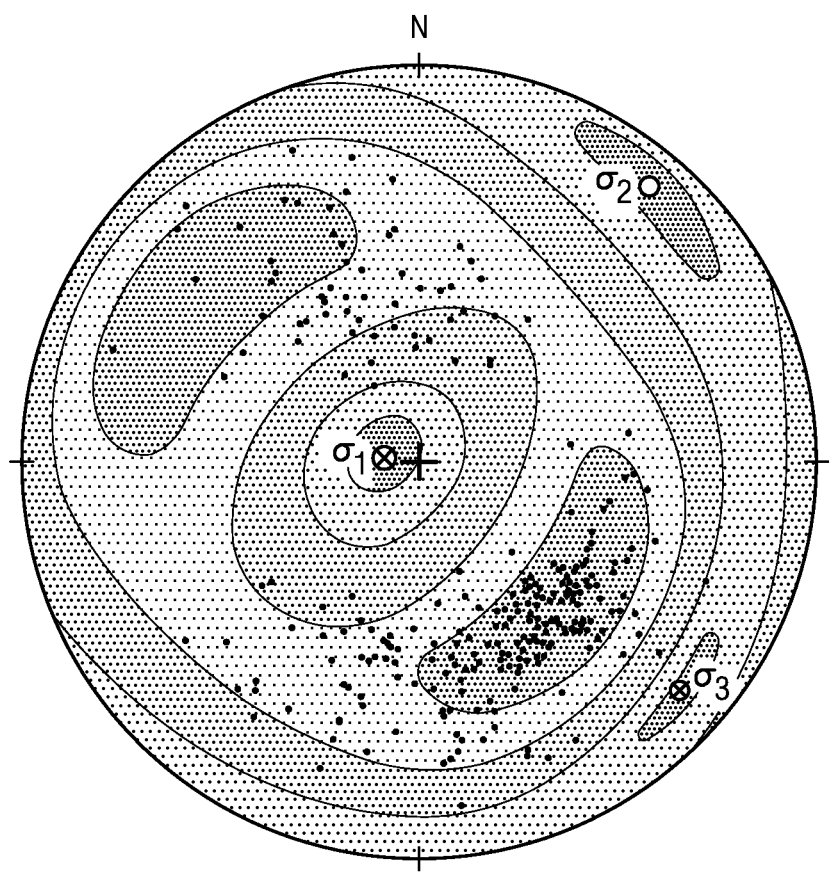

FIGS. 5A, 5B and 5C illustrate the results of the stress inversion method applied to the data of FIGS. 4A, 4B and 4C. In the example of these figures, fault displacement is used as a proxy for slip tendency, as compared to other stress inversion methods. FIG. 5A illustrates normalized fault displacement versus slip tendency, and can be compared with FIG. 2. FIG. 5B is a stress ratio plot illustrating the reasonableness of the results of the stress inversion. The stress state resulting from the inversion method lies within the range of stresses likely to occur within the earth's crust. FIG. 5C is a slip tendency stereoplot of the results of the stress inversion.

Figure 6:
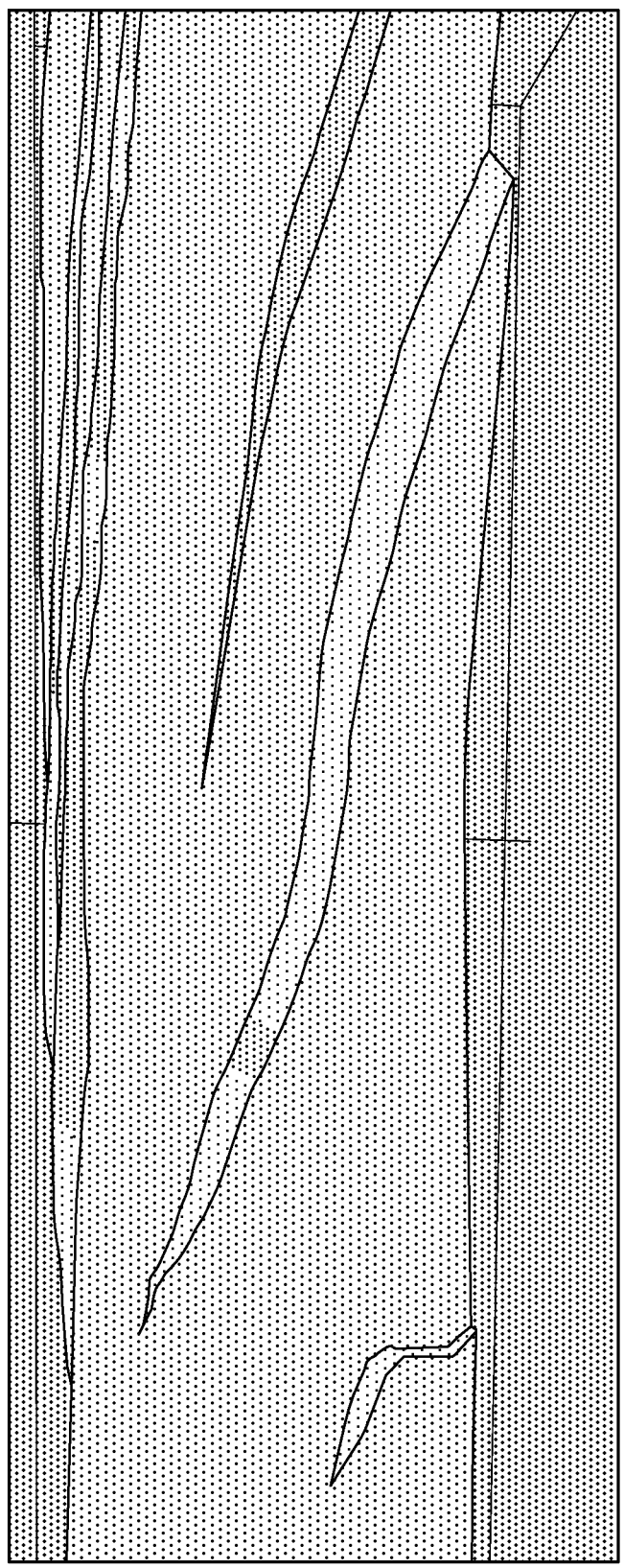
FIG. 6 illustrates source data for the stress inversion method, in the form of fault displacement gaps.

FIG. 6 illustrates source data in the form of fault displacement gap data, available from interpretations of from seismic reflection data. This data is graphically illustrated using commercially available modeling software, such as Petrel or Earthvision. The various "triangles" represent fault orientations and area. As stated above, fault area data can also be used as a proxy for slip tendency. This could also be stated as using fault area as a proxy for fault displacement, which is a proxy for slip tendency. In the error equation set out above, values for normalized A (representing normalized fault area) could be used instead of values for normalized D.

Figure 7A:
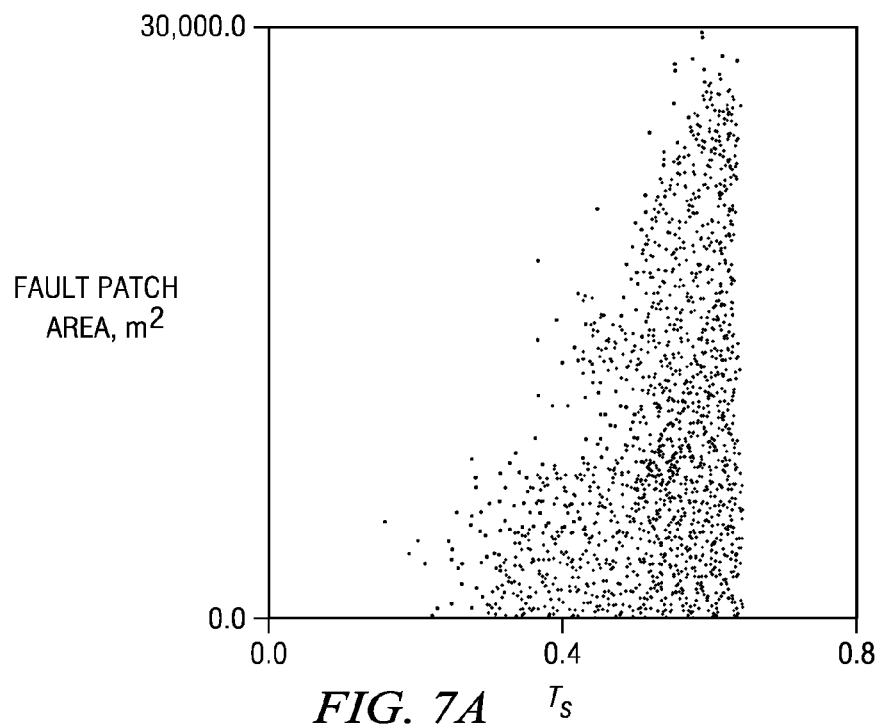
FIGS. 7A, 7B and 7C illustrate the results of the stress inversion method applied to the data of FIG. 6.
Figure 7B:
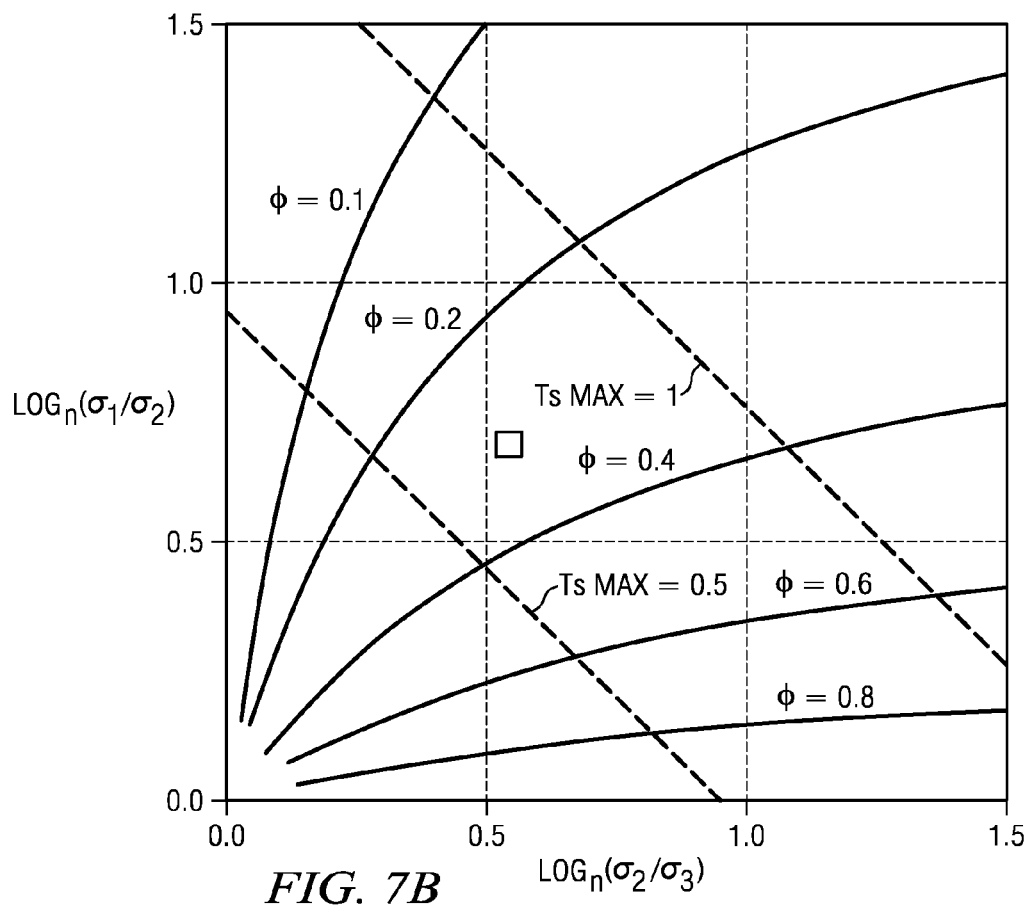
Figure 7C:
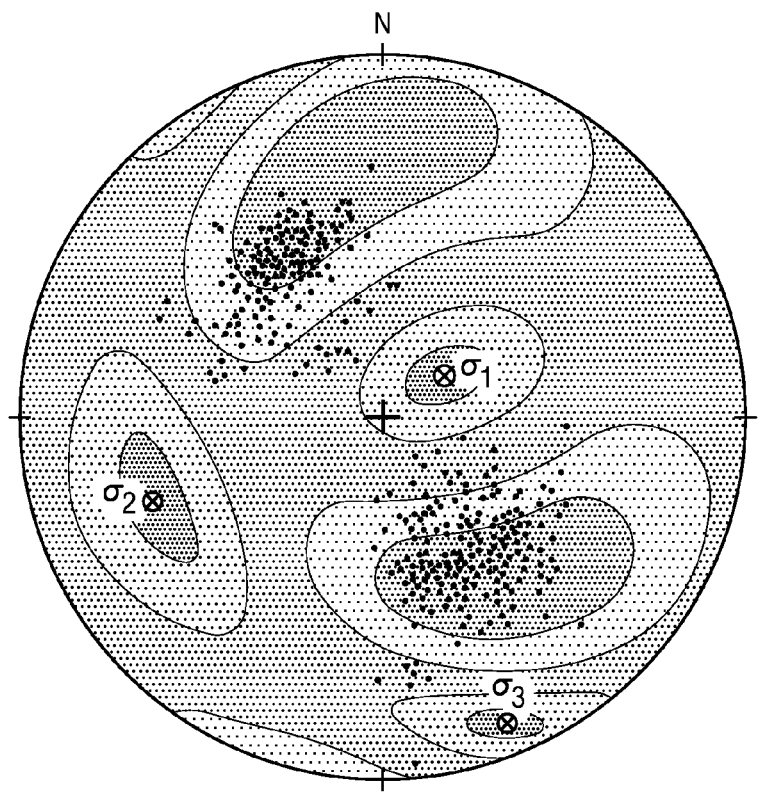

FIGS. 7A, 7B and 7C illustrate the results of the stress inversion method applied to the data of FIG. 6. These figures are of the same types as FIGS. 5A, 5B, and 5C.

As an example of using earthquake focal mechanisms as a proxy for slip tendency, earthquake magnitudes could be used in the error equation rather than displacement values. Such values represent earthquake magnitudes on an exponential scale, but are nevertheless related to slip tendency. Experimentation may show that accuracy of the stress inversion calculations can be improved with a weighting factor to compensate for the exponential nature of the data.

In sum, the above-described stress inversion method uses various source data, including fault displacement, fault area (fault gaps) and earthquake magnitude (or microseismicity or other focal mechanisms) as proxies for slip tendency. This data is referred to herein as "fault displacement data and proxies for fault displacement data". Comparisons with other stress inversion methods indicate the method to be robust in that it is capable of generating a geologically reasonable stress tensor from a variety of data types and densities. Inverted stress tensors are consistent with orientations and displacements on faults, rock strength and burial depths. The method is especially applicable to faults extracted from seismic interpretations as well as field data.

Figure 8:
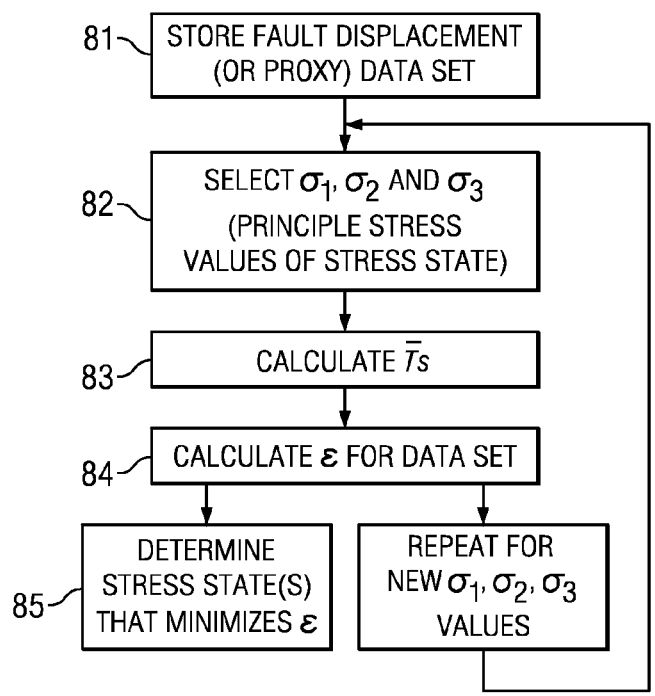
FIG. 8 illustrates a computer implemented method of calculating the stress state of a fault.

FIG. 8 illustrates a computer implemented method of determining a stress state associated with a fault. It is assumed that the computer has appropriate hardware, firmware, and/or software for performing the method.

Step 81 is storing a dataset of fault displacement values (or proxy values) for the fault or faults of interest. Fault displacement values can be of the type described above in connection with FIGS. 4A-4C, and in general, can be any data that characterizes the fault in terms of a set of displacement measurements. Proxy values can include fault area values such as described above in connection with FIG. 6 or other proxy values described herein.

Step 82 is selecting a candidate stress state. As explained above, the stress state is defined by the principle stress values, $\sigma_1$, $\sigma_2$, and $\sigma_3$.

Step 83 is using the selected stress values to calculate a slip tendency value.

Step 84 is using displacement data and the slip tendency value to calculate error measurement values. This is repeated for the displacement dataset.

Steps 82-84 are repeated for a complete set of candidate stress states.

Step 85 is determining the stress state that minimizes the error measurement value. This is the stress state that characterizes the fault or faults of interest.

What is claimed is:

1. A computer-implemented method of determining a stress state associated with a geological fault, comprising:
    storing a data set representing fault displacement values, or proxy displacement values, associated with the fault;
    storing an error function that calculates error as a function of normalized fault displacement and normalized slip tendency;
    selecting principal stress values for a candidate stress state;
    calculating a slip tendency for the candidate stress state for each value in the data set;
    calculating an error value for the data set, using the error function, the slip tendency, and the displacement or the proxy displacement values;
    wherein the error function is conditionally calculated depending on whether the displacement value or proxy displacement value is greater than the slip tendency;
    repeating the selecting and calculating steps for a number of candidate stress states; and
    determining the stress state that minimizes the error value.

2. The method of claim 1, wherein the proxy displacement values are fault area values.

3. The method of claim 1, wherein the proxy displacement values are seismic focal values.

4. The method of claim 1, wherein the proxy displacement values are earthquake magnitude values.

5. The method of claim 1, wherein the error function is further conditionally calculated depending on whether the displacement value or proxy displacement value is zero.

6. The method of claim 1, wherein the step of calculating an error value is performed by means of a sum of squares function.

7. The method of claim 1, wherein the step of determining the stress state that minimizes the error value is performed using a nonlinear regression method.

8. A computer-implemented method of determining a stress state associated with a geological fault, comprising:
    storing a data set representing fault displacement values, or proxy displacement values, associated with the fault;
    storing an error function that calculates error as a function of normalized fault displacement and normalized slip tendency;
    selecting principal stress values for a candidate stress state;
    calculating a slip tendency for the candidate stress state for each value in the data set;
    calculating an error value for the data set, using the error function, the slip tendency, and the displacement or the proxy displacement values;
    wherein the error function is conditionally calculated such that the error value is large if the displacement value is large relative to the slip tendency, but small if the displacement value is small relative to the slip tendency;
    repeating the selecting and calculating steps for a number of candidate stress states; and
    determining the stress state that minimizes the error value.

9. The method of claim 8, wherein the proxy displacement values are fault area values.

10. The method of claim 8, wherein the proxy displacement values are seismic focal values.

11. The method of claim 8, wherein the proxy displacement values are earthquake magnitude values.

12. The method of claim 8, wherein the error function is further conditionally calculated depending on whether the displacement value or proxy displacement value is zero.

13. The method of claim 8, wherein the step of calculating an error value is performed by means of a sum of squares function.

14. The method of claim 8, wherein the step of determining the stress state that minimizes the error value is performed using a nonlinear regression method.

* * * * *